March 8, 1966 C. H. PANCOAST ETAL 3,238,770
SYSTEM ADAPTED FOR DIAGNOSING LARGE NUMBERS
OF AUTOMOTIVE ROAD VEHICLES
Filed Dec. 6, 1962 6 Sheets-Sheet 2

March 8, 1966 C. H. PANCOAST ETAL 3,238,770
SYSTEM ADAPTED FOR DIAGNOSING LARGE NUMBERS
OF AUTOMOTIVE ROAD VEHICLES
Filed Dec. 6, 1962 6 Sheets-Sheet 4

C. H. PANCOAST ETAL 3,238,770
SYSTEM ADAPTED FOR DIAGNOSING LARGE NUMBERS
OF AUTOMOTIVE ROAD VEHICLES

Filed Dec. 6, 1962

March 8, 1966 C. H. PANCOAST ETAL 3,238,770
SYSTEM ADAPTED FOR DIAGNOSING LARGE NUMBERS
OF AUTOMOTIVE ROAD VEHICLES
Filed Dec. 6, 1962 6 Sheets-Sheet 6

3,238,770
SYSTEM ADAPTED FOR DIAGNOSING LARGE NUMBERS OF AUTOMOTIVE ROAD VEHICLES
Charles H. Pancoast, Pitman, and Charles R. Small, Woodbury Heights, N.J., and Fernando A. Pellicciotti, Inglewood, Calif., assignors to Socony Mobil Oil Company, Inc., a corporation of New York
Filed Dec. 6, 1962, Ser. No. 242,846
4 Claims. (Cl. 73—117)

This invention relates to automotive vehicle servicing, and more particularly to a system for thoroughly testing and checking automotive vehicles in order to diagnose any conditions needing correction.

There have been developed many sophisticated techniques and equipment for testing and checking automotive vehicles for various defects, malfunctionings and other conditions which require correction. These techniques and equipment are all very specialized and are designed to diagnose only very specific conditions. Since there are a large number of conditions which might require correction, it is a long drawn-out process to thoroughly test an automotive vehicle in order to provide a diagnosis which will diagnose any condition in an automotive vehicle needing correction, particularly if such condtion is not evident to the operator or owner of the vehicle. As a result, it is not economically practical for a vehicle owner to pay to have this kind of diagnosis performed or for a garage to perform it. The usual procedure is to wait until trouble becomes disturbing and then perform tests to determine the cause of the particular trouble and correct it. This procedure often results in increased expense because the condition was not corrected soon enough. Moreover, since the vehicle owners are not willing to pay the cost of thorough testing and checking, it is not economically practical for a garage to keep on hand the expensive equipment required to perform the more sophisticated testing techniques. As a result, many modern testing techniques, which would more accurately diagnose conditions requiring correction in the vehicle, are not available to the vehicle owner.

The present invention provides a system for completely testing and checking many automotive vehicles in a short period of time by just two diagnosticians. This testing and checking will provide a diagnosis of almost any condition requiring correction in the vehicle even though the conditions are not otherwise evident. Because the entire testing and checking procedure is performed in a short period of time with a minimum of personnel, it can be carried out for a nominal cost, and for the first time it is economically practical to thoroughly test and check automotive vehicles so that conditions can be corrected before they become expensive, thus saving the vehicle owner substantial repair costs. Moreover, the system of the present invention makes it practical to have in one facility equipment for performing the most modern and sophisticated tests and checks on vehicles. As a result, more accurate diagnosis is made available to the vehicle owner.

In order for the system to be economically practical, the entire testing process must be carried out in just a few minutes. Thus time is of the essence and any feature which will save even a few seconds is important to the system, as it is only by using these time-saving features that the system becomes economically practical. The system of the present invention provides an arrangement which eliminates lost and wasted time, thus reducing the time required to test each vehicle. The invention comprises a drive-through diagnostic bay having test equipment mounted therein. Included in the test equipment is a dynamometer having rollers positioned in the driveway of the diagnostic bay so that the vehicles tested may be driven to the positions where first their front wheels and then their rear wheels are engaged by the dynamometer rollers. The diagnostic bay also has a wheel alignment measuring apparatus, which also has rollers positioned in the driveway of the diagnostic bay to engage the wheels of the automotive vehicle so that the automotive vehicle may be driven to position its wheels on the rollers of the wheel alignment measuring apparatus. The vehicles to be tested are tested sequentially first on the dynamometer and then on the wheel alignment measuring apparatus. Each vehicle is driven forward to position the front wheels of the vehicle on the rollers of the dynamometer and then the vehicle is tested with the dynamometer. Then the vehicle is driven forward to position the rear wheels of the vehicle on the rollers of the dynamometer and additional testing equipment is connected to the vehicle. Further tests are then performed on the vehicle with the dynamometer and the additional test equipment. The vehicle is then driven forward to the wheel alignment measuring apparatus to position the front wheels of the vehicle on the rollers of the wheel alignment measuring apparatus and the wheel alignment of the front wheels is then measured. The vehicle is then driven out of the diagnostic bay. In accordance with the present invention, the rollers of the wheel alignment measuring apparatus are positioned far enough forward on the rollers of the dynamometer so that the vehicle is driven forward from the position in which it has its rear wheels engaged by the rollers of the dynamometer to the position in which it has its front wheels engaged by the rollers of the wheel alignment measuring apparatus. This arrangement permits the vehicle to always be moved forward during the test procedure between the positions in which tests are made on the vehicle. Because of this capability, the diagnosticians can complete the tests on the vehicle in a shorter amount of time and, moreover, overlapping is made possible so that the tests on the next succeeding vehicle may be started while the testing is being finished on the preceding vehicle, thus increasing the number of vehicles which may be tested per unit time. The time saved by the present invention contributes substantially to the making possible an economically practical system for diagnosing almost any condtion which might require correction in an automotive vehicle.

Accordingly, it is a principal object of the present invention to provide an improved system for thoroughly testing and checking automotive vehicles.

Another object of this invention is to reduce the time and labor required for thoroughly testing and checking automotive vehicles.

A further object of this invention is to make thorough testing and checking of automotive vehicles economically practical.

A still further object of this invention is to provide for improved diagnosis of conditions requiring correction in automotive vehicles.

A still further object of this invention is to provide for improved diagnosis of conditions in automotive vehicles needing correction in order to reduce repair costs.

A still further object of this invention is to provide a more accurate diagnosis of conditions needing correction in automotive vehicles.

Further objects and advantages of the present invention will become readily apparent as the following detailed description of the invention unfolds, and when taken in conjunction with the accompanying drawings, wherein.

Figure 1:
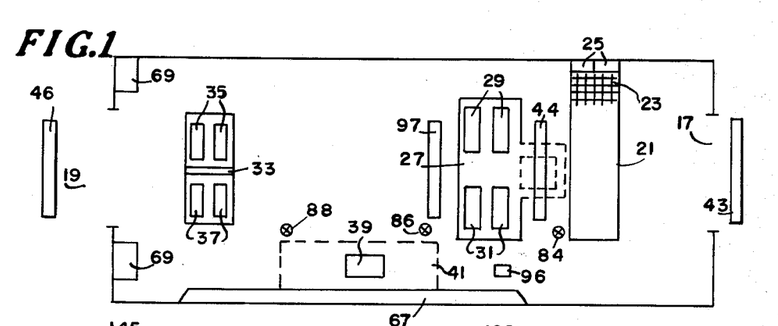
FIG. 1 is a schematic illustration of the layout or floor plan of the diagnostic bay of the invention.

As illustrated in FIG. 1, the drive-through diagnostic bay has an entrance 17 and an exit 19. Automobiles to be diagnosed are driven into the bay through the entrance 17, are tested and diagnosed, and are driven out the exit 19. An exhaust duct 21 is provided under the floor of the drive-through bay. The duct 21 communicates with the bay through a large opening in the floor of the bay about ten feen inside of the entrance 17. This opening is covered by a grate 23, which is strong enough to support the automobiles which will be driven over it. The duct 21 is connected to two vertically disposed ducts 25 on the side wall of the drive-through bay. The ducts 25 lead to exhaust fans, which draw air from the bay through the grate 23 and through the ducts 21 and 25 and exhaust the air outside. The air exhausted in this manner will carry out the exhaust gases of the automobiles and keep the air in the test bay fresh. A Maxwell dynamometer 27 is also mounted in the floor of the test bay. The Maxwell dynamometer 27 has two pairs of rollers 29 and 31 for receiving the right and left wheels of an automotive vehicle. These pairs of rollers are positioned in the floor of the test bay, approximately twenty-one feet from entrance 17. The bay also has a Merrill wheel aligner 33 which has pairs of rollers 35 and 37 located in the floor of the test bay. The rollers 35 and 37 are positioned twenty-five feet forward of the rollers 29 and 31 of the dynamometer 27 towards the exit 19, and are spaced to receive the right and left wheels of the automotive vehicles to be tested. The spacing between the rollers of the Maxwell dynamometer 27 and the rollers of the Merrill wheel aligner 33 is longer than the wheel bases of the automotive vehicles to be tested so that a vehicle, after being tested with its rear wheels on the rollers 20 and 31, moves forward to the position in which its front wheels are on the rollers 35 and 37 of the Merrill wheel aligner. Because of this arrangement, valuable time in the testing procedure is saved. Suspended from overhead in the bay is an instrument carriage 39 which can be moved by its suspension system anywhere within the dotted line 41. An instrument and control panel 67 mounted on the left hand wall of the test bay is located approximately in the middle of the test bay between the Maxwell dynamometer 27 and the Merrill wheel aligner 33. Two blowers 69 are located on opposite sides of the exit 19 within the test bay. These blowers provide a supply of fresh air to the bay and are used to maintain the temperature within the diagnostic bay at the desired level.

The entrance 17 and the exit 19 are provided with doors which are opened and closed by positioning mechanisms. The positioning mechanism for the door in the entrance 17 will raise this door to its open position in response to a vehicle running over a treadle 43 positioned across the vehicle driveway outside the entrance 17. The positioning mechanism for the entrance door will close the entrance door in response to a vehicle running over a treadle 44 positioned inside of the entrance 17 across the floor of the diagnostic bay between the entrance 17 and the rollers 29 and 31 of the dynamometer 27. The treadle 44 is positioned sufficiently far enough from the entrance 17 for any vehicle which has its front wheels on the treadle 44 to be out of the entrance 17. The entrance 17 is provided with a photocell adapted to sense any vehicle or other obstruction in the entrance 17 and apply a signal indicating the presence of such an obstruction in the entrance 17 to the positioning mechanism for the entrance door. In response to such a signal from this photocell the positioning mechanism for the entrance door will hold the entrance door in its raised position even if a vehicle is on the treadle 44. The positioning mechanism for the door in the exit 19 will raise this door to its open position in response to the actuation of a switch and will lower the exit door to its closed position in response to a vehicle running over a treadle 46 positioned across the vehicle driveway outside the exit 19. The exit 19 is provided with a photocell to sense any vehicle or other obstruction in the exit 19 and apply a signal indicating the presence of such an obstruction to the positioning mechanism for the exit door. In response to receiving such a signal from this photocell the positioning mechanism for the exit door will hold the exit door in its open position regardless of whether a vehicle is on the treadle 46 or not.

As will be pointed out below, some of the test equipment is mounted on the instrument carriage 39 and some is mounted in the instrument and control panel 67. The position of the instrument control panel 67 was selected to minimize the time of making the tests with the equipment mounted therein.

Figure 2:
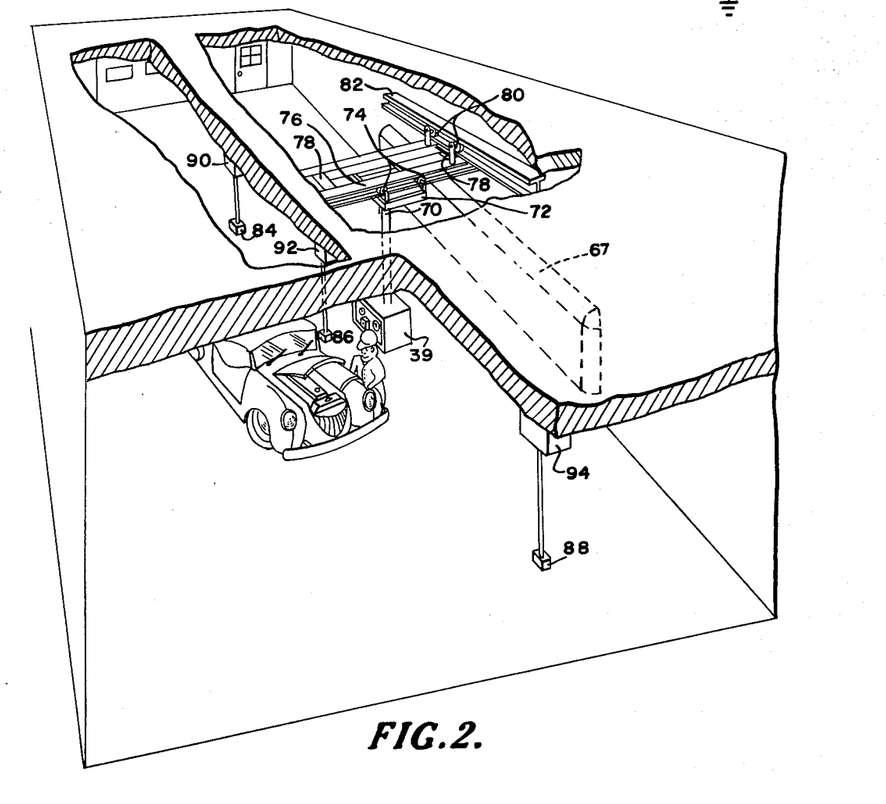
FIG. 2 is a view in perspective of the diagnostic bay with portions of the roof and walls broken away to reveal the interior of the bay.

The use of the mobile instrument carriage 39 saves valuable time in the testing procedure because it facilitates the connection of the equipment to the vehicles being tested. FIG. 2, which shows the interior of the test bay in perspective, illustrates how the instrument carriage 39 is suspended to be easily movable anywhere within the dotted line 41. The instrument carriage 39 is fixed to the lower end of a vertical post 70, the upper end of which is fixed to trolley 72. The trolley 72 is provided with wheels 74 which roll on overhead tracks 76, the trolley 72 being suspended by its wheels 74 from the tracks 76. The tracks 76 extend perpendicular to the direction of vehicle traffic in the diagnostic bay. The tracks 76 comprise two beams which are rigidly held together by cross bars 78 and the assembly of the tracks 76 and cross bars 78 is suspended by wheels 80 from tracks 82, which also comprise two beams. The tracks 82 extend perpendicular to the tracks 76, or in other words parallel to the direction of vehicle traffic in the diagnostic bay. The tracks 76 are movable along the length of the tracks 82 on the wheels 80. Thus the instrument carriage 39 can be moved perpendicularly to the direction of vehicle traffic in the diagnostic bay by movement of the trolley 72 along the tracks 76, or can be moved parallel to the direction of vehicle traffic by movement of the tracks 76 along the tracks 82, and thus can be moved anywhere within the dotted line 41.

Figure 13:
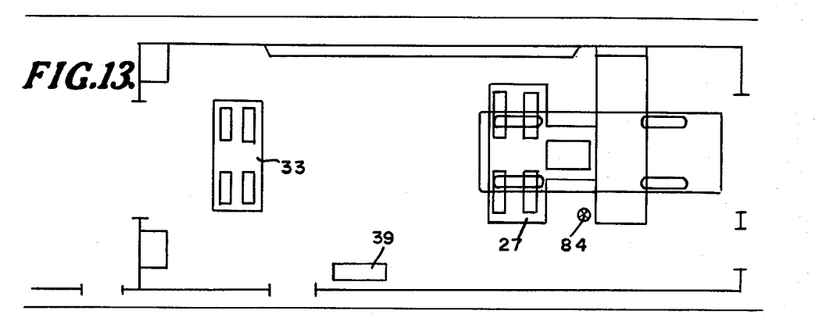
FIGS. 13 through 15 are schematic diagrams illustrating various positions of a vehicle as it is processed through the diagnostic procedure.
Figure 14:
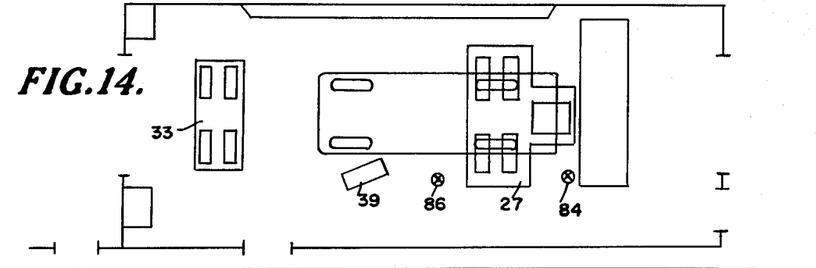

As shown in FIGS. 1 and 2, pendants 84, 86 and 88 hanging from the ceiling are spaced along the length of the diagnostic bay. These pendants are normally retracted and are extended when needed. The pendant 84 contains control switches to operate the dynamometer 27 and is positioned when extended to be operated by a person sitting in the driver's seat of a vehicle in the position shown in FIG. 13, with its front wheels in the rollers 29 and 31 of the dynamometer 27. The pendant 86 has switches to control the dynamometer 27 and the other equipment used in conjunction with the dynamometer 27. The pendant 86 is positioned when extended to be operated by a person in the driver's seat of a vehicle in the position shown in FIG. 14, with its back wheels on the rollers 29 and 31 of the dynamometer 27. The pendant 88 has switches controlling the operation of the Merrill aligner 33 and is positioned to be operated by a person sitting in the driver's seat of a vehicle in the position shown in FIG. 15 with its front wheels in the rollers 35 and 37 of the Merrill aligner 33. The pendants 84, 86 and 88 hang from positioning units 90, 92 and 94, respectively, and are positionable by these units in either an extended position where they hang low enough to be operated by the vehicle driver or in a raised position in which they are retracted out of the way. The positioning unit 90 will lower the pendant 84 in response to actuation of a switch operated by a foot treadle 96, which is positioned in the floor of the bay between the left wall and the dynamometer 27. The foot treadle 96 also closes a switch which actuates the dynamometer 27 to lower its wheel lift. The positioning unit 90 will raise the pendant 84 in response to actuation of a switch in the pendant 84. The positioning unit 92 will lower the pendant 86 in response to actuation of a switch operated by a vehicle treadle 97 positioned across the diagnostic bay between the dynamometer 27 and the Merrill wheel aligner and will raise the pendant 86 in response to actuation of a switch in the pendant 86. The positioning unit 94 will lower the pendant 88 in response to actuation of a switch in the pendant 86. With this arrangement, the positioning units 90, 92 and 94 can be operated to lower the pendants 84, 86 and 88 only when they are needed and to keep them retracted out of the way at all other times.

Figure 3:
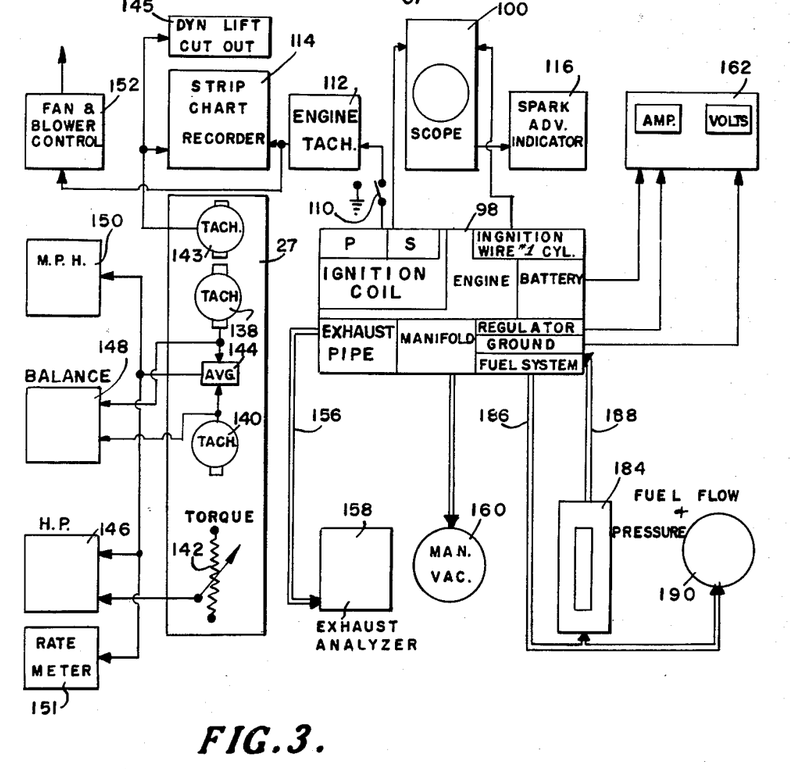
FIG. 3 is a block diagram illustrating how equipment in the test bay is connected to the engine of a vehicle under diagnosis.
Figures 4, 6:
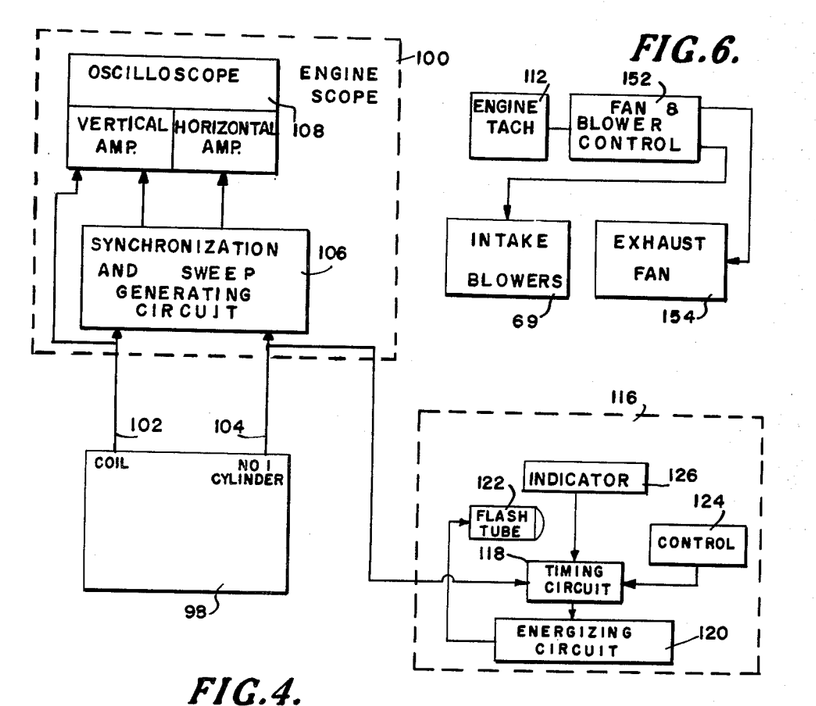
FIG. 4 is a block diagram illustrating the engine scope and the spark advance indicator and how they are interconnected in accordance with the present invention.
FIG. 6 is a block diagram illustrating the ventilation control system for the diagnostic bay.

FIG. 3 is a block diagram illustrating the test equipment in the diagnostic bay when it is connected up with the engine of an automotive vehicle. The engine of the vehicle is designated by the reference number 98. As shown in FIG. 3, an engine scope 100 has one lead connected to the high voltage output of the ignition coil and another lead connected to the ignition wire of the No. 1 cylinder of the engine. The details of the engine scope are disclosed in the Patent No. 2,608,093, invented by Alfred E. Traver and issued on August 26, 1952, and in the copending application Serial No. 172,016, entitled "Analyzer for Internal Combustion Engine," filed on February 8, 1962, and invented by Alfred E. Traver. As disclosed in the Traver patent the engine scope simultaneously depicts a plurality of vertically separated horizontal wave-forms, one for each cylinder of the engine and synchronized with the functioning of such cylinder. FIG. 4 is a block diagram which illustrates how the engine scope is used in the present invention. As in the Traver patent, the scope leads are clipped over the insulation of the wires of the engine to be capacitively connected thereto rather than being directly connected. In FIG. 4 these leads are designated by the reference numbers 102 and 104. The leads designated 102 and 104 feed the signal voltages generated at the high voltage output of the ignition coil and at the ignition wire of the No. 1 cylinder to a synchronization and sweep generating circuit 106 in the engine scope 100. The circuit 106, in response to the applied signals, feeds appropriate waveforms to the vertical and horizontal amplifiers of an oscilloscope 108, as is disclosed in the Traver patent, in order to produce the vertically separated horizontal traces, each synchronized with a different cylinder. In order to depict the waveform of the high voltage output of the igntion coil for each cylinder, the lead 102, which applies the signal from the ignition coil to the synchronization and sweep generating circuit 106, is also connected to the input of the vertical amplifier of the oscilloscope 108. With this arrangement, the oscilloscope shows the voltage waveform at the output of the ignition coil for each cylinder as it fires and immediately thereafter. From these waveforms a diagnostician can determine the dwell for each cylinder; he can determine whether the spark plug and the igntion wire are in satisfactory condition for each cylinder; he can determine whether the coil, the points and the condenser are in satisfactory condition; and he can determine whether the distributor lobes, the distributor drive and the distributor bearings are in satisfactory condition.

The interconnection of the synchronization circuitry 106 and the oscilloscope 108 is made internally in the engine scope, and the diagnostician only has to make two connections in order to connect the engine scope to the engine of the vehicle being tested.

As shown in FIG. 3, the movable pole of a switch 110 is connected to the primary winding of the ignition coils of the engine 98. In one position the switch 110 connects the primary winding to ground, shorting it out, and in the other position the switch 110 connects the ignition coil primary to the input of an engine tachometer 112. When the switch 110 connects the primary winding of the ignition coil to the tachometer 112, the tachometer 112, in response to the pulses generated in the ignition coil by the action of the breaker points, produces a visual indication of the revolutions per minute of the engine and also produces an electrical output signal representing this value. The electrical signal produced by the engine tachometer 112 is fed to a strip chart recorder 114. A spark advance indicator 116 is connected to the engine scope 100 to produce a visual display of the basic timing of the engine and indicate the total spark advance.

FIG. 4 includes a block diagram of the spark advance indicator circuit and illustrates how it is interconnected with the engine scope. As shown in FIG. 4, the signal from the No. 1 cylinder ignition wire on lead 104 is applied to a timing circuit 118 of the spark advance indicator 116. In response to each pulse on lead 104, the timing circuit 118 triggers an energizing circuit 120, which in response thereto energizes a flash tube 122. A pulse will occur on lead 104 simultaneously with each firing of the No. 1 cylinder. Thus, each time the spark plug of the No. 1 cylinder fires, the flash tube 122 will be energized. The timing circuit 118 will either trigger the energizing circuit 120 immediately in response to each pulse on lead 104 or will trigger it after a time delay which is continuously and selectively variable by means of a control 124. The timing circuit 118 also applies a signal to an indicator 126, which provides a visual indication of the amount of delay provided by the timing circuit 118. Because the spark advance indicator 116 receives its signal from the lead 104, it does not have to be separately connected to the engine 98, and the diagnostician, upon connecting the leads 102 and 104 to the engine 98, has connected both the engine scope 100 and the spark advance indicator 116 to the engine, thus saving valuable time.

Figure 5:
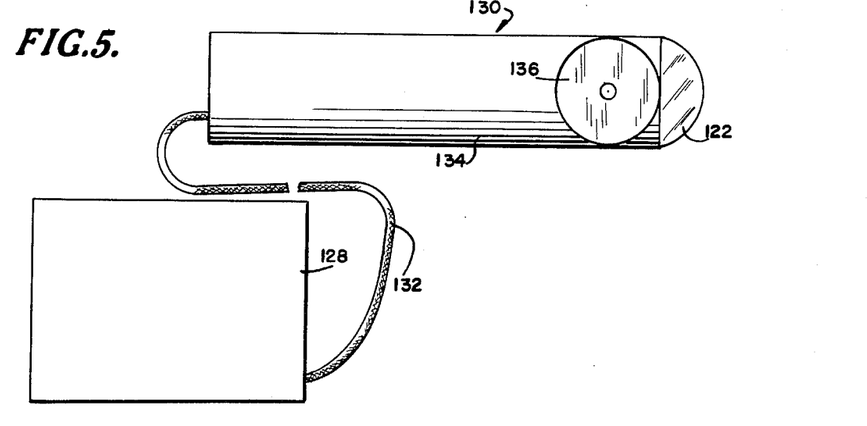
FIG. 5 illustrates structural details of the spark advance indicator.

FIG. 5 illustrates the structure of the spark advance indicator. As shown in FIG. 5, the spark advance indicator comprises a housing 128 and a remote flash unit 130 connected to the housing 128 by a cable 132. The timing circuit 118, the energizing circuit 120, and the indicator 126 are mounted in the housing 128. The remote flash unit 130 includes the flash tube 122 and the control 124. The interconnections between the flash tube 122 and the energizing circuit 120 and between the control 124 and the timing circuit 118 are through the cable 132. The flash tube 122 and the control 124 are mounted in a barrel casing 134 which functions as a handle. The control 124 is manually operated by means of a knob 136. By adjusting the angular position of the knob 136, the delay provided by the timing circuit 118 can be selected.

In operation the diagnostician illuminates the timing marks in the engine 98 with the flash tube 122. This illumination will cause the timing marks to apparently stop in stroboscopic illusion at the position they are in each time the flash tube 122 is energized. The timing marks cooperate with a reference mark to indicate the position of the piston in the No. 1 cylinder relative to top dead center when the flash tube 122 is energized. In order to read basic timing, which is the position of the piston in the No. 1 cylinder relative to top dead center when it fires with no distributor induced spark advance, or in other words at idle speed, the diagnostician by means of the knob 136 selects no delay by the timing circuit 118 and the engine is operated at idle speed. The diagnostician then illuminates the timing marks with the flash tube and observes the indication, which will be the basic timing of the engine. In order to observe the spark advance at a particular speed, the engine is operated at the speed of interest and the knob 136 is adjusted until the indication by the timing marks is the same as that of basic timing. The delay indicated by the indicator 126 as being provided by the timing circuit 118 will be the spark advance at this particular speed. Because the control 124 is provided with the remote flash unit 130 instead of on the housing 128 the diagnostician taking the spark advance reading is able to obtain this reading in a much shorter time.

The Maxwell dynamometer 27 has a tachometer 138 producing a signal proportional to the speed at which the rollers 29 are driven, a tachometer 140 producing a signal proportional to the speed at which the rollers 31 are driven, and a transducer 142 which produces an output signal proportional to the torque being absorbed or transmitted by the motor of the dynamometer 27. The dynamometer 27 has a third tachometer 143 which like the tachometer 138 produces an output signal proportional to the speed at which the rollers 29 are driven. The output signal produced by the tachometer 143, which will be proportional to the wheel speed of the vehicle, is applied to the strip chart recorder 114. The strip chart recorder 114 thus receives a signal proportional to the wheel speed of the vehicle and a signal proportional to the engine speed of the vehicle. The strip chart recorder 114, when it is actuated, produces a chart with two traces, one of which represents the engine r.p.m. vs. time and the other of which represents wheel speed vs. time over the same period. From the recording done by the strip chart recorder 114, the engine r.p.m. can be compared with the rear wheel speed and the operation of the vehicle transmission can be analyzed. The output signal from the tachometer 143 is also fed to a dynamometer lift cut out circuit 145, which in response to receiving a signal from the tachometer 143 prevents the dynamometer 27 from raising its wheel lift. This circuit prevents accidental raising of the dynamometer wheel lift when the wheels of a vehicle are turning on the rollers of the dynamometer 27. The output signal of the tachometers 138 and 140 are applied to averaging circuit 144, which produces an output signal proportional to the average of the output signals of the tachometers 138 and 140 and representing the average wheel speed of the vehicle. No averaging is needed in the strip chart recording operation because in this operation both rear wheels will be driven at approximately the same speed. The output signal from the transducer 142 representing the torque absorbed by the dynamometer motor and the output signal of the averaging circuit 144, which represents the wheel speed of the vehicle, are fed to a horsepower meter 146. In response to these signals the horsepower meter 146 produces a visual indication of the horsepower transmitted between the vehicle wheels and the dynamometer 27. The output signal from the tachometer 138 and the output signal of the tachometer 140 representing the right and left wheel speeds are fed to a balance meter 148, which provides a visual indication of the difference in the speeds represented by the output signals of the tachometers 138 and 140. Thus the balance meter 148 produces a signal representing the difference in speeds of the right and left vehicle wheels. This balance meter 148 connected in this manner can be used to provide an indication of the braking balance between the wheels, the balance of horsepower transmitted to the rear wheels, and a balance of the parasitic horsepower absorbed by the wheels. The output signal of the averaging circuit 144 is also fed to an m.p.h. meter 150, which produces a visual indication of the speed represented by the output signal of the averaging circuit 144 and thus a visual indication of the vehicle wheel speed. The output signal of the averaging circuit 144 is also fed to a rate meter 151, which by means of a resistor and capacitor network measures and indicates the rate of change of the output signal of the averaging circuit 144. The indication of the rate meter 151 will therefore be a measure of the acceleration of the wheels of the vehicle.

The output signal from the engine tachometer 112 is also fed to a fan and blower control 152, which controls the rate that air is exhausted from and fresh air is brought into the bay. The block diagram in FIG. 6 illustrates how the fan and blower control 152 operates. The system is provided with two exhaust fans which exhaust air from the test bay through the ducts 21 and 25. One of the exhaust fans runs all of the time and the other, designated by the reference number 154 in FIG. 6, is controlled automatically in response to the output signal from the engine tachometer 112. When the engine tachometer 112 is not producing an output signal, the fan and blower control 152, in response to this zero output signal of the engine tachometer 112, runs the intake blowers 69 at half speed and maintains the exhaust fan 154 shut off. When the engine tachometer 112 produces an output signal, the fan and blower control 152, in response to this signal, will operate the intake blowers 69 at full speed and will maintain the exhaust fan 154 turned on. In this manner the exhaust fan 154 is run only when the engine of the vehicle under diagnosis is being run under test with the engine tachometer 112. During the other parts of the testing when the engine of the vehicle is not running under test and less air exhaustion is need, the fan 154 is automatically shut off. The intake blowers 69 are automatically run at full speed only when the exhaust fan 154 is being operated, thus providing an increased supply of temperature-conditioned air when the exhaust fan 154 is running. Thus the amount of air being exhausted from the diagnostic bay and the amount of fresh air being brought into the diagnostic bay are automatically increased when the engine of a vehicle is being run under test in the diagnostic bay.

Figure 7:
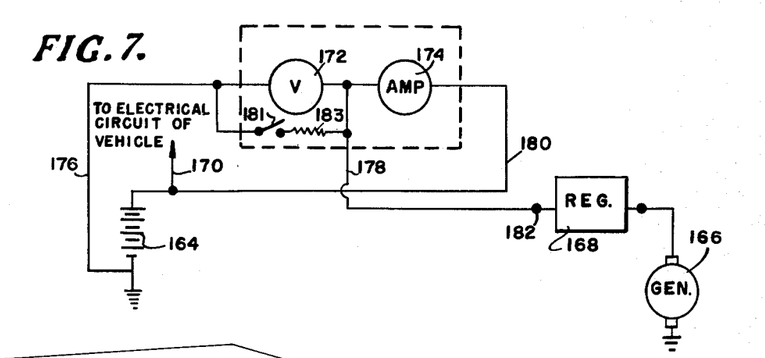
FIG. 7 is a circuit diagram of the volt amp tester illustrating how it is connected to the vehicle engine.

As shown in FIG. 3, a tube 156 is connected to sample exhaust from the exhaust pipe of the engine 98. The tube 156 feeds a sample of the exhaust gas to an exhaust analyzer 158, which measures the percentage of $CO_2$ in the exhaust gas and produces a visual indication of this measurement. This indication reflects the combustion efficiency of the engine 98. A vacuum gauge 160 is connected to measure the vacuum at the intake manifold and produces a visual indication of this measurement. A volt amp tester 162 is connected to measure the generator current and to measure the voltage between the regulator battery terminal and ground. The volt amp tester 162 is used to provide an indication of the regulated generator output amperage and voltage and also an indication of the amperage when the cutout relay of the regulator opens and the voltage at which it closes. It is also used to provide an indication of the cranking battery voltage. The volt amp tester of the present invention requires only three leads instead of the usual five. Because of this fact, the diagnostician has to connect only three leads between the volt amp tester and the engine, and as a result valuable time is saved. FIG. 7 is a circuit diagram illustrating the circuit of the volt amp tester and how it is connected to the electrical system of the vehicle under diagnosis. In FIG. 7 the vehicle battery is designated by the reference number 164, the vehicle generator by the reference number 166, and the regulator by the reference number 168. In a conventional vehicle electrical system one side of the battery is grounded and the other side of the battery is connected to one terminal of the generator through the regulator, the other terminal of the generator being grounded. The junction between the battery and the regulator is connected to the vehicle electrical circuit including the ignition switch, the starter motor, the ignition coil, the lights, horn, etc. In FIG. 7 the lead which in the electrical system connects the vehicle circuit to the junction between the battery 164 and the regulator 168 is designated by the reference number 170. The volt amp tester 162 comprises a voltmeter 172 and an ammeter 174. One terminal of the voltmeter 172 is connected to one terminal of the ammeter internally in the volt amp tester. The three leads of the volt amp tester are designated by the reference numbers 176, 178 and 180. The lead 178 is connected to the junction between the voltmeter 172 and the ammeter 174. The lead 176 is connected to the other terminal of the voltmeter 172 and the lead 180 is connected to the other terminal of the ammeter 174. A switch 181 and a load resistor 183 are connected in series across the voltmeter 172 between the lead 176 and the lead 178.

As shown in FIG. 7, when the volt amp tester is connected to the electrical system of the vehicle, the lead running between the lead 170 and the regulator 168 is disconnected from the terminal of the regulator, which is designated 182, and connected to the lead 180. The lead 178 is connected to the terminal 182 and the lead 176 is connected to the ground. In this manner when the switch 181 is open the electrical system of the vehicle is connected to function normally with the ammeter 174 connected to measure the current flowing between the regulator 168 and the lead 170, or in other words the current of the generator 166 and the voltmeter 172 connected to measure the voltage between the terminal 182 and ground. When the switch 181 is closed it imposes a known load provided by the resistor 183 on the generator so that the regulated output of the generator can be checked under a known load.

As shown in FIG. 3, a flow meter 184 is connected by means of fuel lines 186 and 188 between the fuel pump and the carburetor to measure the rate of fuel flow. A fuel pressure gauge 190 is connected to the fuel line between the fuel pump and the carburetor to measure the fuel pump pressure. When the fuel flow meter 184 is connected up with the fuel system, it, together with the fuel lines 186 and 188, is connected in series with the regular fuel line between the fuel pump and the carburetor. To eliminate the labor of separately connecting the fuel pressure gauge 190 to the engine fuel line, the fuel pressure gauge 190 is connected permanently to the fuel line 186. Thus once the flow meter 184 is connected in the fuel system of the vehicle, the pressure gauge 190 will also be connected to measure the fuel pressure between the fuel pump and the carburetor.

The engine scope 100, the spark advance indicator 116, the volt amp tester 162, the manifold vacuum gauge 160, the fuel flow meter 184 and the fuel pressure gauge 190 are all mounted in the instrument carriage 39, which is suspended from overhead to be freely movable within the dashed line 41 as described above, so that these instruments may be easily connected to the vehicle to be tested. The instruments mounted on the instrument carriage 39 all retract their leads into the carriage 39 when the leads are not in use. The fan control 152 and the strip chart recorder 114, the balance meter 148, the horsepower meter 146, the m.p.h. meter 150, the rate meter 151, the engine tachometer 112, and the exhaust gas analyzer 158 are mounted in the instrument and control panel 67.

Figure 8:
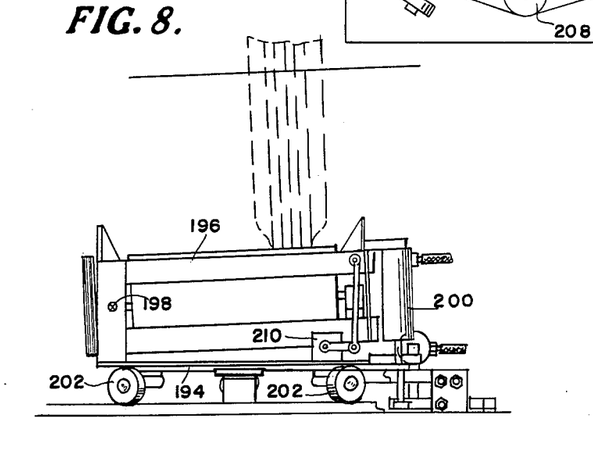
FIG. 8 is a view in elevation of the Merrill wheel aligner, which is used in the system of the present invention.
Figure 9:
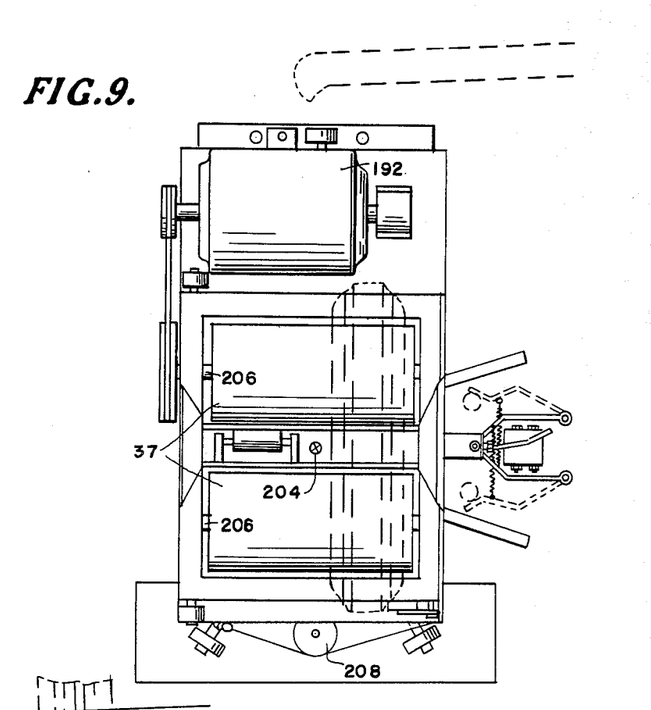
FIG. 9 is a plan view of the Merrill wheel aligner.

The above described instruments will be connected to the engine of the vehicle in the manner described when the vehicle is being tested on the Maxwell dynamometer 27. After being tested on the Maxwell dynamometer 27 the vehicle is then advanced until its front wheels fall into the rollers 35 and 37 of the Merrill aligner 33. The Merrill aligner 33 provides a visual indication of the caster and camber of the left wheel, a visual indication of the caster and camber of the right wheel, and a visual indication of the total toe of the front wheels. In the Merrill aligner the rollers 35 and 37 are mounted on carriages. When the front wheels of the vehicle under diagnosis are on the rollers 35 and 37, the rollers 35 and 37 are driven at a constant speed by electric motors and in turn the rollers 35 and 37 drive the front wheels of the vehicle. Means are provided in the carriages mounting the rollers 35 and 37 to position the rollers 35 and 37 so that the axes of the rollers 35 are parallel with the axis of the right front wheel of the vehicle and the axes of the rollers 37 are parallel with the left front wheel of the vehicle. FIGS. 8 and 9 show the details of the carriage mounting the rollers 37 and illustrate how the carriage aligns the axes of the rollers 37 parallel with the axis of the left front wheel. The carriage mounting the rollers 35 aligns the axes of the rollers 35 with the axis of the right front wheel in the same manner that the carriage mounting the rollers 37 aligns the rollers 37. As shown in FIGS. 8 and 9, the rollers 37 are driven by electric motor 192 which is also mounted on the carriage. The carriage comprises a base 194, on which the electric motor 192 is mounted, and an upper bracket 196 which is pivotable with respect to the base 194 and on which the rollers 37 are rotatably mounted. The bracket 196 pivots on the base 194 about a pivot point designated 198 and the amount that the bracket 196 is pivoted with respect to the base 194 is controlled by means of a hydraulic servo unit 200. The base 194 is mounted on rollers 202 and is pivotable about a fixed vertical axis 204 on the rollers 202. When the rollers 37 are driving the front wheel of the vehicle the base 194 will pivot about the vertical axis 204 due to forces exerted on the rollers 37 until the horizontal components of the axes of the rollers 37 are parallel with the horizontal component of the axis of the vehicle wheel. However, due to the camber of the wheel, the axes of the rollers 37 will still not necessarily be parallel with the axis of the wheel. The hydraulic servo unit 200 will pivot the bracket 196 with respect to the base 194 until the axes of the rollers 37 are parallel with the axis of the vehicle wheel. To provide the control for the hydraulic servo unit 200 to achieve this result, the rollers 37 are axially slidable short distances on their axles 206. When the rollers 37 are driving the vehicle wheel and the axis of the vehicle wheel due to its camber is not aligned with the axes of the rollers 37, the vehicle wheel will exert forces on the rollers 37 sliding them to one side or the other, depending upon the direction of the misalignment. The rollers 37, on being slid to one side, will actuate a microswitch, and in response to the actuation of this microswitch the hydraulic servo unit 200 will be energized to change the angular position of the bracket 196 with respect to the base 194 in a direction to eliminate the misalignment of the axis of the vehicle wheel with the axes of the rollers 37. Similarly, when the rollers 37 are slid to the other side in response to the misalignment being in the opposite direction, the rollers 37 will actuate a microswitch, in response to which the hydraulic servo unit 200 will change the angular position of the bracket 196 with respect to the base 194 in the opposite direction until the misalignment is eliminated. In this manner the axes of the rollers 37 are made parallel with the axis of the vehicle wheel. A potentiometer 208 produces an output signal representing the angular position of the base 194 with respect to the fixed vertical axis 204. When the rollers 37 have been aligned with the vehicle wheel, the output signal of the potentiometer 208 will therefore represent the toe of the vehicle wheel. A potentiometer 210 produces an output signal representing the angular position of the bracket 196 with respect to the base 194. When the rollers 37 have been aligned with the vehicle wheel, the output signal of the potentiometer 210 will represent the camber of the vehicle wheel. The carriage supporting the rollers 35 produces output signals representing toe and camber in the same manner. To obtain the caster of a vehicle wheel on the rollers 37, the Merrill aligner uses the circuit illustrated in FIG. 10. While the rollers 37 drive the vehicle wheel thereon and the rollers are maintained aligned therewith, the vehicle wheels are turned 7½° to the right. The output signal voltage of the potentiometer 210 when the wheels are turned 7½° to the right is stored in a storage means 207. The vehicle wheels are then turned 7½° to the left and the output signal voltage of the potentiometer 210 is stored in a storage means 209. A differential amplifier 211 then amplifies the difference between the signal voltage stored in the storage means 207 and that stored in the storage means 209 and applies a signal proportional to this difference to a meter 213, which provides an indication of this signal. When these operations have been carried out, the output signal of the differential amplifier 211 will be proportional to and the meter 213 will indicate the caster of the wheel in the rollers 37. An identical circuit is provided for the rollers 35 to measure the caster of the wheel in these rollers in the same manner. The caster measuring operations are performed simultaneously so that the wheels only need to be turned to the right and to the left once to obtain the caster measurement for both wheels.

Figures 10, 11:
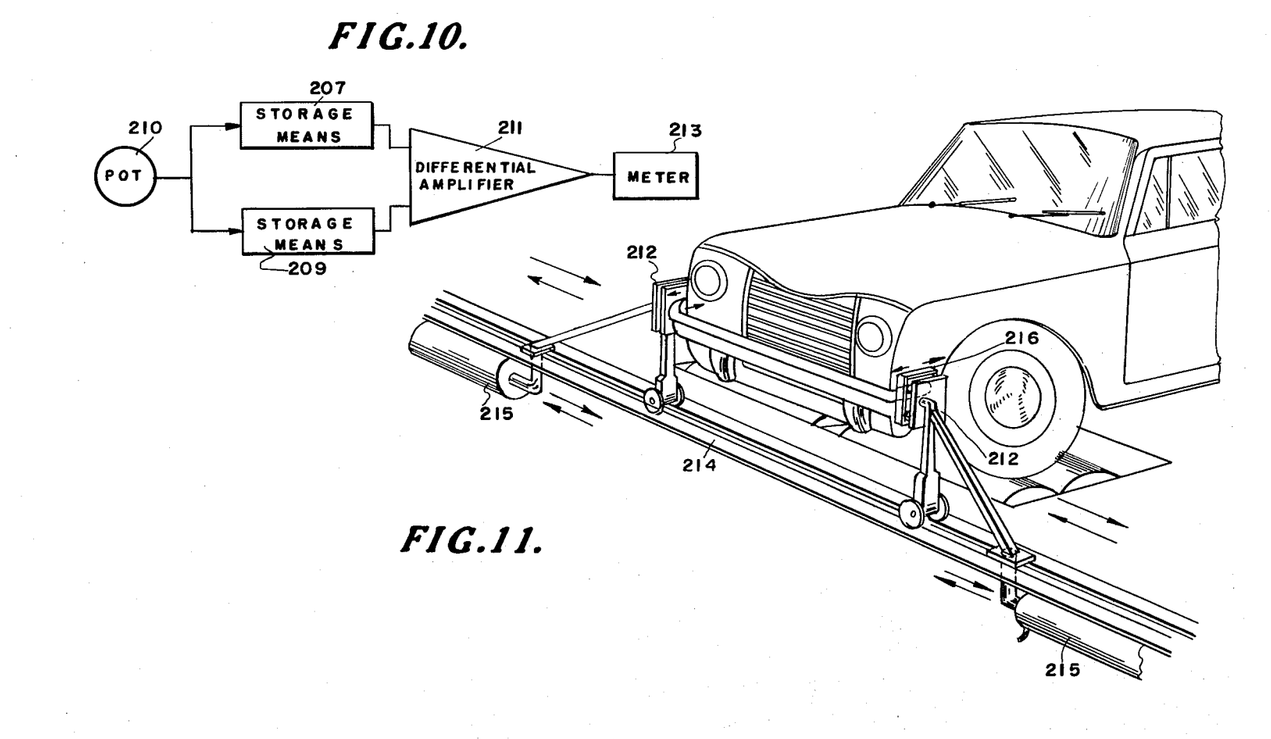
FIG. 10 illustrates a circuit used in the Merrill wheel aligner for measuring caster.
FIG. 11 illustrates the horizontal stabilizer of the present invention used in combination with the Merrill wheel aligner.

When the vehicle is being tested on the Merrill aligner in this manner, it is necessary to hold the front of the vehicle in place so that it does not slide off the rollers to the right or the left. The device for providing this holding is called a horizontal stabilizer. The horizontal stabilizer of the present invention, which is illustrated in FIG. 11, permits it to be quickly and easily applied to the vehicle without having to actually be bolted thereto, thus saving valuable time in the diagnostic procedure. As shown in FIG. 11, the horizontal stabilizer comprises a pair of braces 212 which move transversely across the drive-through bay driven by hydraulic cylinders 215, on a track 214 recessed beneath the floor of the drive-through bay. Carriages 217 are mounted on the braces 212 to have a limited horizontal movement with respect to the braces 212 transverse to the direction that the braces themselves are moveable. The carriages 217 have rollers which engage the braces to provide the limited motion for the carriages. Springs hold the carriages 217 normally in the center of their range of movement. The carriages 217 have mounted thereon rubber cushions 216 and are positioned to engage the wrap-around part of a vehicle bumper with these rubber cushions when the front wheels of the vehicle are lodged in the rollers 35 and 37 of the Merrill aligner 33. When the front wheels of the vehicle have been so positioned, the braces 212 are moved inwardly by the hydraulic cylinders 215 toward the vehicle on the track 214 until the rubber cushions 216 engage the wrap-around part of the bumper of the vehicle and firmly hold the front of the vehicle in position. Because the carriages 217, on which the rubber cushions are mounted, have a limited horizontal movement with respect to the braces 212, the braces 212 engaging the vehicle and holding the vehicle on the rollers 35 and 37 will not interfere with the caster reading operation. The moveable carriages permit the pivoting of the vehicle frame that occurs when the front wheels are turned 7½° to the right and left during the caster reading procedure while still preventing the vehicle frame from moving sideways.

When the vehicle is driven off the rollers 35 and 37 after the alignment has been checked, the vehicle wheels exert force on the carriages mounting the rollers 35 and 37 tending to move these carriages forward. This action automatically activates table locks which hold the carriages in position and prevent them from being banged about as vehicle wheels pass over them. A switch is provided in the pendant 88 to release the table locks.

Figure 12:
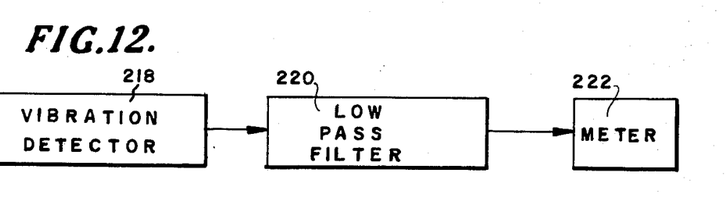
FIG. 12 illustrates a system used for measuring wheel unbalance.

FIG. 12 illustrates the system for testing the unbalance of a front wheel of the vehicle. The system as shown in FIG. 12 makes use of a vibration detector 218, which is attached to the suspension assembly of the front wheel being tested, and preferably on the lower control arm of this assembly. As shown in FIG. 12, the output signal of the vibration detector is fed through a low pass filter 220 and then to meter 222 which indicates the amplitude of the filtered signal. When the wheel is rotated, the vibration detector 218 mounted on the wheel suspension assembly will produce an output signal which varies in accordance with the amount of wheel unbalance. This output signal will be at a frequency equal to the revolutions per second that the wheel is rotated. The low pass filter 220 filters out signals and noise in the output signal of the vibration detector above the frequency of the signal caused by the wheel unbalance and serves to eliminate these extraneous signals. There will be no substantial extraneous signals or noise in the output of the vibration detector 218 below the frequency of the signal caused by wheel unbalance. The measurement of the wheel unbalance of the front wheels of the vehicle is taken when the front wheels of the vehicle are positioned on the rollers 29 and 31 of the dynamometer and these rollers are used to impart the rotation to the wheels required for the unbalance measurement. A separate system such as that shown in FIG. 12 is connected to the suspension assembly of each front wheel in the test procedure so that the unbalance of both front wheels can be measured simultaneously.

Two diagnosticians are employed at the diagnostic center to carry out the tests and diagnoses on the automotive vehicles. The procedure of testing and diagnosis on each vehicle is planned to take the least possible amount of time per vehicle being tested so as to make the complete testing and diagnosis of all manner of malfunctionings of automotive vehicles economically practical. To achieve this purpose the schedule of testing procedure eliminates lost or wasted time by the diagnosticians.

Figure 15:
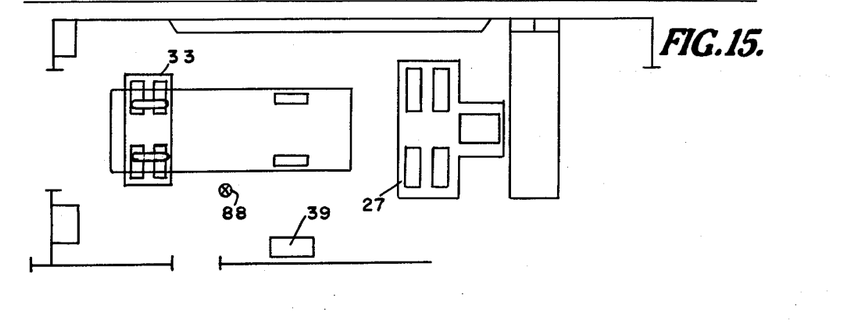

To facilitate the description of the procedure, the diagnosticians are designated A and B. While diagnostician B is busy with the preceding vehicle, diagnostician A drives the next vehicle up to the entrance 17. When the vehicle passes over the treadle 43, the entrance door raises automatically and diagnostician A drives the vehicle through the entrance 17 to the first testing station in which the vehicle is in the position shown in FIG. 13. In proceeding to this testing station, the vehicle passes over the treadle 44 and this action causes the entrance door to close again automatically. When the vehicle is positioned at the first testing station, the front wheels of the vehicle will be positioned between the rollers of the dynamometer. At this time the lift for the dynamometer will be in its raised position so the front wheels of the vehicle will be resting on the dynamometer lift. The diagnostician A then gets out of the vehicle and checks the tires of the vehicle and adjusts their pressure. At this time diagnostician A also attaches the vibration detectors of the wheel unbalance detection systems illustrated in FIG. 12 to the front wheel suspension assemblies. Next the diagnostician A checks the transmission fluid level and obtains a sample of the fluid for purposes of analysis. Diagnostician A then checks the radiator, the engine oil level, the fan belt, the hoses, the heat riser, the headlights and other lights on the vehicle, the park brake, the horn, the wipers, the turn signals, checks for audible exhaust leakage, and measures the battery capacity. A Hoppy Lev-L-Lite manufactured by Hopkins Manufacturing Company of Emporia, Kansas, is used to check the alignment of the headlights. Meanwhile during this time diagnostician B has driven the preceding car out of the diagnostic bay from exit 19 and discusses the diagnosis on the preceding vehicle with the owner. After performing the checks described above, diagnostician A actuates the foot treadle 96. This action causes the dynamometer to lower its wheel left and the positioning unit 90 to lower the pendant 84 to the extended position. Diagnostician A gets into the vehicle and then energizes the dynamometer motor so that the rollers 29 and 31 drive the front wheels of the vehicle. Diagnostician A controls the operation of the dynamometer when the vehicle is in the position shown in FIG. 13 by means of switches on the control pendant 84, which will be in its extended position and hang next to the driver's window when the vehicle is in this position. Thus the driver can control the operation of the dynamometer from the driver's seat, and valuable time is saved. While the rollers 29 and 31 are driving the front wheels, the horsepower required to drive the front wheels is read by the diagnostician A on the horsepower meter 146 and recorded. This horsepower is referred to as parasitic horsepower. The diagnostician A also reads the balance meter 148 and records this reading. This reading provides the parasitic horsepower balance of the front wheels. At this time he also reads and records the amount of front wheel unbalance indicated by the meters 222 in the wheel unbalance detection systems attached to the front wheel suspension assemblies. Then while the dynamometer 27 is driving the front wheels, the diagnostician A applies the brakes, and while the brakes are applied he reads the horsepower meter 146. This gives a reading of the efficiency of the front wheel brakes. While the brakes are applied the diagnostician A also reads the balance meter 148 and records this reading, which is an indication of the balance of the front wheel brakes. While the parasitic horsepower and brake tests on the front wheels are being carried out by diagnostician A, diagnostician B enters the diagnostic bay and performs an analysis on the transmission fluid sample obtained from the vehicle by diagnostician A. This analysis of the transmission fluid determines the degree of oxidation of the transmission fluid. If the oxidation of the transmission fluid is too high, then the fluid should be changed to avoid damaging the vehicle transmission. The tests for the oxidation of the fluid is fully described in a copending application entitled Method For Estimating Quickly the Neutralization Number For Automatic Transmission Fluid, invented by Charles Frederick Feasley and Fernando Albert Pellicciotti and filed on November 30, 1962, Serial No. 241,168. When diagnostician B has completed the analysis of the transmission fluid and diagnostician A has completed the brake test on the front wheels of the vehicle, diagnostician B disconnects the vibration detectors from the front wheel suspension assemblies. Diagnostician A then stops the dynamometer motor and actuates the wheel lift between the rollers 29 and 31 by means of control switches on the pendant 84. The switch that actuates the wheel lift also actuates the positioning unit 90, which then retracts the pendant 84 to its raised position. The wheel lift raises the front wheels out from between the rollers 29 and 31 so that the vehicle can be driven forward. Diagnostician A then drives the vehicle forward and runs over the treadle 97, which action causes the dynamometer 27 to lower its lift and the positioning unit 92 to lower the pendant 86 to its extended position. Diagnostician A drives the vehicle forward until the rear wheels of the vehicle are on the rollers 29 and 31 of the dynamometer 27. At this time the vehicle will be in the position shown in FIG. 14. Diagnostician B then walks to the front of the car and sets chocks on the front wheels to hold the vehicle rear wheels on the rollers 29 and 31. Diagnostician B then opens the hood of the vehicle, removes the air cleaner and connects the fuel flow meter 184 and the fuel pressure meter 190 into the fuel system by means of the fuel lines 186 and 188, as described above. The fuel flow meter 184 will then be connected between the fuel pump and the carburetor, and the fuel pressure meter 190 will be connected to measure the pressure in the fuel line between the fuel pump and the carburetor. While diagnostician B is connecting up the fuel flow meter 184 and the fuel pressure meter 190, diagnostician A gets out of the vehicle and inserts the combustion efficiency sample hose 156 in the tailpipe of the vehicle and then connects the engine scope 100 to the high voltage output of the ignition coil and the ignition wire of the No. 1 cylinder, as described above. Also while the diagnostician B is connecting up the fuel flow meter 184 and the fuel pressure meter 190, the diagnostician A connects the vacuum gauge 160 to the engine manifold. Diagnostician B then connects the volt amp tester 162 to the engine. Diagnostician B then connects the switch 110 to the primary of the ignition coil and throws the switch to the position in which it shorts out the primary. Meanwhile, diagnostician A gets back into the driver's seat. Diagnostician A then engages the engine starter, and diagnostician B reads and records the cranking voltage which will be indicated by the voltmeter of the volt amp tester. If the cranking voltage is not within specification limits, diagnostician B then reads and records the ampere draw, which will be indicated by the ammeter of the volt amp tester when the primary of the ignition coil is shorted out and the starter switch is engaged. Diagnostician B then positions the switch 110 to the position in which it connects the engine tachometer to the primary of the ignition coil. Diagnostician A then starts the vehicle engine and lets it idle. While the engine is idling, diagnostician A reads and records the engine r.p.m. shown on the engine tachometer 112, thus obtaining an indication of the engine idle speed. Also while the engine is idling, diagnostician A reads the vacuum gauge 160 to obtain the manifold vacuum at idle. The reading of the exhaust gas analyzer 158 is read and recorded while the engine is idling by the diagnostician A to provide a reading of the combustion efficiency at idle. Diagnostician B, while the engine is idling, reads and records the basic timing indicated by the spark advance indicator 116. Diagnostician A then increases the engine speed gradually to 1200 r.p.m. as indicated by the engine tachometer 112. While the engine speed is being gradually increased in this manner, diagnostician B reads the regulator cutout closing voltage, which will be indicated by the voltmeter of the volt amp tester 162. Diagnostician A then holds the engine speed at 1200 r.p.m. as indicated by the engine tachometer 112, and reads and records the exhaust analyzer 158, which will indicate combustion efficiency at 1200 r.p.m. Diagnostician B, while the engine is being held at 1200 r.p.m., closes the switch 181 on the volt amp tester 162 and reads the regulated voltage output of the generator indicated on the volt amp tester 162. Diagnostician B then opens the switch 181 and diagnostician A opens the throttle rapidly and returns to 1200 r.p.m. and at the same time reads and records the indication of the exhaust analyzer 158 to obtain the carburetor accelerating pump efficiency. Meanwhile the diagnostician B synchronizes the engine scope 100, if necessary, and makes a preliminary reading of the waveforms on the engine scope. Diagnostician A then increases the engine speed to 2500 r.p.m. and holds the engine speed at this value as indicated by the engine tachometer 112. While the engine speed is held at 2500 r.p.m. the combustion efficiency is read and recorded from the exhaust gas analyzer 158. Diagnostician B, while the engine speed is being held at 2500 r.p.m., reads and records the maximum spark advance indicated by the spark advance indicator 116. Diagnostician A then returns the engine speed to idle gradually, and while this gradual return to idle is being carried out by diagnostician A, diagnostician B reads and records the regulator cutout opening amperes indicated by the volt amp tester 162. Diagnostician A then after the engine speed reaches idle reads and records the fuel pump pressure meter 190. Diagnostician A next starts the strip chart recorder 114 by actuating a switch in the pendant 86, which will be in its extended position and hang next to the driver's window when the vehicle is in the position shown in FIG. 14. Diagnostician A then accelerates the car through all gears while diagnostician B observes the waveforms on the engine scope 100. The strip chart recorder will shut itself off automatically after a predetermined time interval. The time interval will be long enough to exceed the duration of the acceleration of the vehicle through all of its forward speeds so that the chart of the engine and wheel speed versus time covers the full cycle of acceleration. Diagnostician A then adjusts the engine speed until the miles per hour meter 150 indicates that the vehicle is driving the dynamometer 27 at 50 m.p.h. Diagnostician A then observes the speedometer and records the difference between the speed indicated by the speedometer and that indicated by the miles per hour meter 150, to obtain a calibration of the speedometer. Then while the engine is driving the dynamometer rollers at 50 m.p.h. as indicated by the miles per hour meter 150, the diagnostician A reads the fuel flow indicated by the flow meter 184. This indication of the fuel flow meter 184 is then used to determine the miles per gallon obtained by the vehicle at 50 m.p.h. Diagnostician A then opens the throttle of the vehicle to wide open. While the vehicle is accelerating diagnostician A reads the rate meter 151 to obtain an indication of the acceleration of the vehicle. Diagnostician A then returns the vehicle to 50 m.p.h., energizes the dynamometer motor by means of a switch at pendant 86 and opens the throttle to wide open. While the throttle is at wide open, diagnostician A observes the maximum horsepower generated by the vehicle as indicated by the horsepower meter 146. Also while the throttle is wide open the diagnostician A reads and records the fuel pressure indicated by the fuel pressure meter 190. During this time diagnostician B continues to observe the waveforms on the engine scope. Diagnostician A then closes the throttle and places the transmission of the vehicle in neutral. At this time diagnostician B records the conclusions reached from observation of the waveforms depicted by the engine scope. He records the dwell and whether or not the firing voltage is satisfactory and whether or not the condition of the points, ignition wires, the coil, the condenser, and the distributor drive, lobes and bearings are satisfactory. Diagnostician A then observes the parasitic horsepower for the rear wheels indicated by the horsepower meter 146 and observes the parasitic horsepower balance for the rear wheels indicated by the balance meter 148. Next diagnostician A applies the brakes and observes the reading of the horsepower meter 146 to determine the efficiency of the rear brakes. While the brakes are applied, diagnostician A also observes the reading of the balance meter 148 to determine the balance of the rear brakes. While the car is being put through these paces, the diagnostician B disconnects all the equipment from the vehicle except the fuel flow meter, fuel pressure meter, and the combustion efficiency analyzer. Diagnostician A then turns off the dynamometer motor and stops the rear wheels with the vehicle brakes. Diagnostician A then turns off the vehicle engine and records the pertinent data on the data sheet. While diagnostician A is performing these operations, diagnostician B disconnects the fuel flow meter 184 and the fuel pressure meter 190 from the fuel system and reconnects the original fuel lines of the vehicle. Diagnostician A then again starts the engine and diagnostician B observes the fuel system to see if there are any fuel leaks. Diagnostician B then installs the air cleaner and tears the recorded chart off from the strip chart recorder 114. Diagnostician B then gives this strip chart to diagnostician A and diagnostician A attaches the strip chart to the data sheet. Diagnostician B then removes the combustion efficiency sample hose 156 of the exhaust gas analyzer 158 from the exhaust pipe and then diagnostician A actuates the dynamometer lift by means of a control switch on the pendant 86 to raise the rear wheels of the vehicle out from between the rollers 29 and 31. The operation of this control switch also actuates the positioning unit 94, which then lowers the pendant 88 to its extended position. Diagnostician A then drives the vehicle forward until the front wheels are in the rollers 35 and 37 of the Merrill aligner 33, as shown in FIG. 15. Diagnostician B then leaves the diagnostic bay to pick up the next vehicle to be diagnosed. Diagnostician A then releases the table locks for the Merrill aligner and actuates the horizontal stabilizer for the Merrill aligner by means of switches on the pendant 88. The hydraulic pistons of the horizontal stabilizer then drive the braces 212 inwardly until the rubber cushions engage the wraparound part of the bumper of the vehicle and hold the vehicle in place. Diagnostician A then checks the wheel alignment on the Merrill aligner 33 by reading the amount of toe, camber and caster. Diagnostician A operates the Merrill aligner by means of switches on the pendant 88 to take these readings entirely while sitting in the driver's seat of the vehicle. After these readings are taken, diagnostician A actuates a switch on the pendant 88, which switch actuates the horizontal stabilizer to retract the braces 212 from the vehicle, actuates the positioning unit 94 to raise the pendant 88 to its retracted position, and actuates the positioning mechanism for the exit door to raise the exit door. Diagnostician A then drives the vehicle out of the diagnostic bay through the exit 19 and passes over the treadle 46. In response to the vehicle passing over the treadle 46, the positioning mechanism for the exit door lowers the exit door to its closed position. Diagnostician A then enters the customer lounge to discuss the results of the analysis with the customer. While diagnostician A is performing the wheel balance and wheel alignment checks and discussing the results of the analysis with the customer, diagnostician B has already started the test procedure on the next vehicle. On the next vehicle, diagnostician B performs the duties that were performed by diagnostician A on the preceding vehicle, and vice versa.

Many modifications may be made to the above described specific embodiment of the invention without departing from the spirit and scope of the invention, which is defined in the appended claims.

What is claimed is:

1. In a system provided for rapid, efficient, uniform diagnoses of a plurality of in line closely following, independently, intermittently moving automotive road vehicles to determine and identify deficient characteristics of each thereof by testing each said vehicle at each of a plurality of stations as said vehicle is rolled in normal manner to and beyond each said station in proceeding to a point of exit, whereby each vehicle will be diagnosed to substantially the same and overall extent sufficient to provide a master record of its faults and thereby permit its repair and correction as desired subsequent to diagnosis, comprising a diagnostic passageway having an entrance and an exit, constructional means spacing said plurality of stations along said passageway thereby adapting same to receive said line of vehicles with one vehicle at at least each of a majority of said stations with working space between said respective vehicles, means determining the width of said passageway at least sufficiently wide to permit lengthwise transit of said line of vehicles and sufficiently narrow to require substantially lengthwise transit of each successive vehicle in said line through each successive station, diagnostic test equipment operative at each said station adapted for a different diagnostic test sequentially on each respective vehicle in said line when said vehicles are rolled successively to each said station, dynamic vehicle testing means at at least one of said stations in energy transmission engagement successively with a rotating wheel of each respective vehicle in said line when said vehicles are rolled successively to said station, diagnostic test equipment operative simultaneously from different stations adapted for initiating a diagnostic test on at least one vehicle in said line prior to completion of a different diagnostic test on another vehicle in said line, support means disposed along substantially the entire length and width of the bottom of said passageway of strength sufficient to support all vehicles being diagnosed when said vehicles reside normally on their own respective tires along said passageway, means determining the width of those portions of the length of said passageway at which vehicle diagnoses are performed sufficiently narrow to permit along said portions of said passageway limited lateral movement of each vehicle in said line when rolled on its own tires but to require generally lengthwise transit of each said vehicle, means constituting a portion of said constructional spacing means for providing substantially only working space between adjacent vehicles in said line and space for rolling each said vehicle to the next station, and a total combination of said diagnostic test equipment to provide, on each vehicle in said line during its course through said passageway, information sufficient for correction of substantially all sub-normal conditions and sub-normal operating characteristics of each such vehicle of the kind which commonly are sub-normal in automotive road vehicles particularly after prolonged road driving, the total combination of equipment operative from said stations consisting substantially entirely of diagnostic equipment and equipment ancillary and necessary thereto, and including dynamic test equipment adapted for energy transfer engagement with a plurality of rotating tires of each vehicle in said line successively to simulate road driving, and different diagnostic equipment operative separately and simultaneously from different diagnostic stations to provide different diagnostic test simultaneously on a plurality of vehicles in said line, the improvement in which said diagnostic equipment operative separately and simultaneously from different diagnostic stations comprises a dynamometer, rotatable means adapted to drive said dynamometer and also to be driven by said dynamometer and adapted for rotatable engagement at one time with the two front tires and at a different time with the two rear tires of successive vehicles being rolled in said line along said diagnostic passageway, and adapted for engagement similarly with the front and rear tires of successive vehicles in said line, said diagnostic equipment also comprising a wheel alignment measuring apparatus, rotatable means driven by said wheel alignment measuring apparatus adapted for rotatable engagement at a separate time with the two front tires of successive vehicles being rolled in said line along said diagnostic passageway, and adapted for engagement similarly with the front tires of successive vehicles in said line, and means constituting a portion of said constructional spacing means for spacing apart the said dynamometer rotatable means and the said wheel alignment measuring apparatus rotatable means thereby requiring that each vehicle in said line must be rolled along said passageway, from a position of tire engagement with one of said rotatable means into succeeding position of tire engagement with the other of said rotatable means, a distance sufficient to enable a succeeding vehicle to be rolled at the same time into tire engagement with said first mentioned rotatable means, whereby a large number of vehicles may be diagnosed sequentially and substantially continuously for overall operation as aforesaid including simulated road operation, thereby to provide information on deficient conditions and performance characteristics of each vehicle in said line sufficient to enable correction without actual road testing or further general diagnosis.

2. The system of claim 1 in which the said dynamometer rotatable means and the said wheel alignment measuring apparatus rotatable means constitute adjacent diagnostic stations through both of which all vehicles in said line must pass in immediate succession without passing an intervening station.

3. The system of claim 2 in which all vehicles in said line are rolled through both said dynamometer station and said wheel alignment measuring apparatus station in a forward direction with the front wheels of each vehicle preceding the rear wheels, and in which the distance between said dynamometer rotatable means and said wheel alignment measuring apparatus rotatable means is substantially only sufficient to enable a succeeding vehicle of maximum length commonly diagnosed in the said diagnosis station to be rolled into rear tire engagement with the dynamometer rotatable means concurrently with front tire engagement of a vehicle of the same length with said wheel aligner rotatable means.

4. The system of claim 2 in which said dynamometer rotatable means constitutes said first rotatable means in rotatable engagement successively at different times with the rear tires of each vehicle in said line, and said wheel alignment measuring apparatus rotatable means constitutes said second rotatable means in rotatable wheel alignment measuring engagement at the same respective times with the front tires of each preceding vehicle.

References Cited by the Examiner
UNITED STATES PATENTS 2,702,432    2/1955    Martin    73—117 XR
3,020,753    2/1962    Maxwell    73—117

OTHER REFERENCES

Article: Shop Planning and Layout, In Motor Age, vol. 79, page 47. August 1960. TL1 M88.

RICHARD C. QUEISSER, *Primary Examiner.*

DAVID SCHONBERG, *Examiner.*